UNITED STATES PATENT OFFICE.

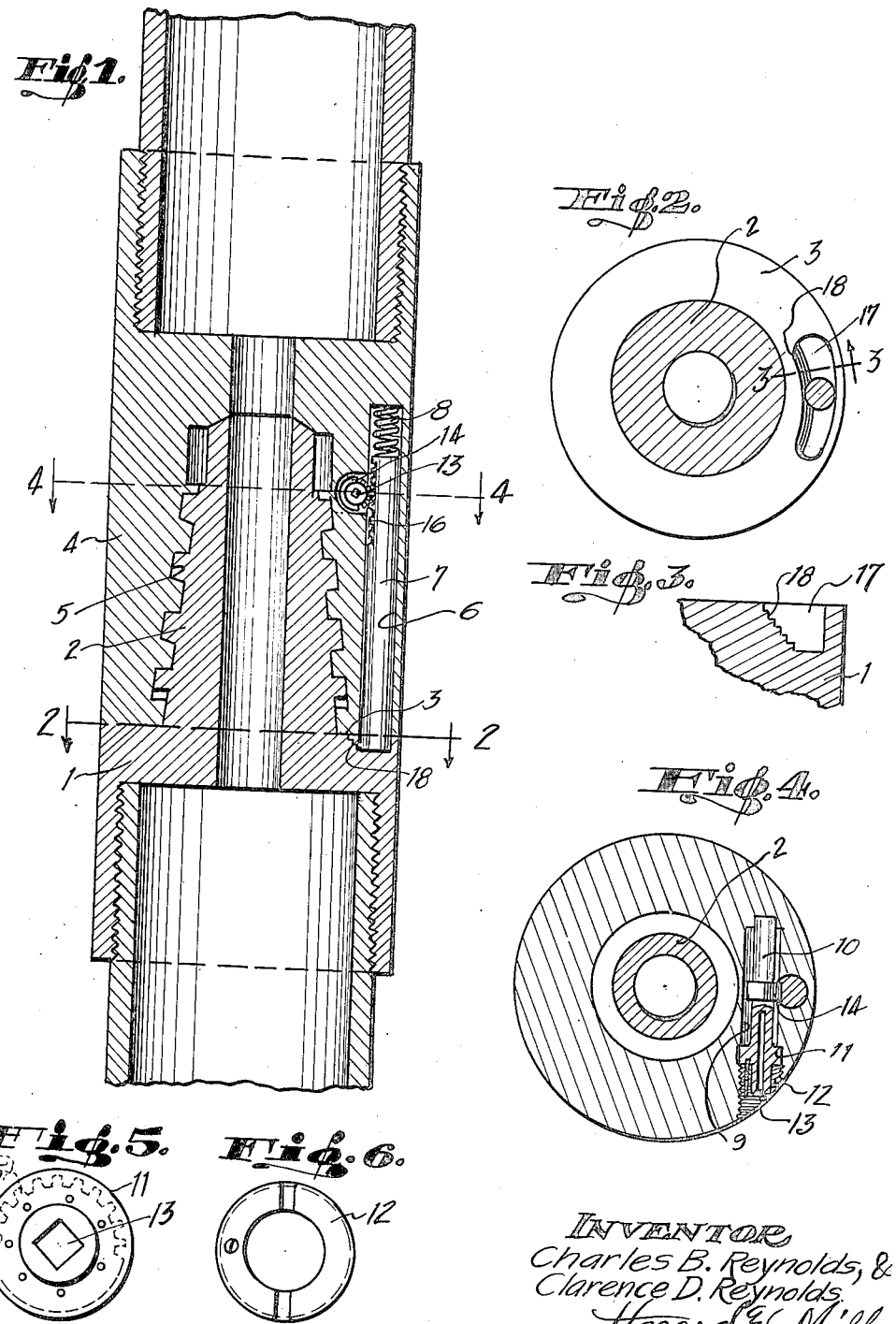

CHARLES B. REYNOLDS AND CLARENCE D. REYNOLDS, OF WHITTIER, CALIFORNIA.

TOOL-JOINT LOCK.

1,417,411. Specification of Letters Patent. Patented May 23, 1922.

Application filed November 11, 1920. Serial No. 423,408.

*To all whom it may concern:*

Be it known that we, CHARLES B. REYNOLDS and CLARENCE D. REYNOLDS, citizens of the United States, residing at Whittier, in the county of Los Angeles and State of California, have invented new and useful Improvements in Tool-Joint Locks, of which the following is a specification.

It is the object of this invention to provide a lock for tool joints comprising a threaded connection or wherever two members are connected by a threaded connection.

The lock provides positive means for retaining the threaded members against rotation relative to one another after they have been secured together. The lock also provides for taking up any wear which may occur in the threaded connection between the members and is also so constructed that the lock may be readily manipulated and easily removed from and placed in position.

The invention will be readily understood from the following description of the accompanying drawings, in which;

Figure 1 is a longitudinal section through a tool joint having the improved locking means.

Fig. 2 is a transverse section on the line 2—2 of Fig. 1.

Fig. 3 is a detail section on the line 3—3 of Fig. 2.

Fig. 4 is a transverse section on the line 4—4 of Fig. 1.

Fig. 5 is an enlarged end view of the operating member for the lock.

Fig. 6 is a similar view of the lock nut for said operating member.

In the drawings I have illustrated the improved lock as employed in connection with a tool joint consisting of a threaded connection, although it will be obvious that the invention may be as readily applied to any construction wherein two members are threaded together and it is desired to lock the same in such position against relative rotation tending to unscrew the members.

One of the parts of the tool joint consists of a member 1 having a threaded pin 2 projecting longitudinally beyond the same and forming an annular shoulder 3. The other part of the tool joint consists of a member 4 having a threaded socket 5 arranged for threaded connection with pin 2.

The member 4 at one side of socket 5 is provided with a longitudinal bore 6 adapted to receive a locking rod 7. A coil spring 8 is interposed between the end of the lock rod and the base of the bore so as to normally project the end of the lock rod beyond the end of the member 4.

Means are provided for retracting the lock rod within its bore against the tension of spring 8, said means including a transverse bore 9 extending into the member 4 and communicating with the bore 6. An operating rod is received in the bore 9, said rod being shown at 10. A bearing for this rod is provided in the base of bore 9, and an enlargement 11 is, preferably, provided upon the rod adjacent its outer end. A lock nut 12 is threaded into the bore 9 over the outer end of rod 10 so as to seat against the enlargement 11. By this means the rod 10 is movably held in position within its bore but may be readily removed by simply removing the lock nut 12. The outer end of rod 10 is provided with a longitudinal bore 13 shown as a square bore adapted to receive a suitable wrench member for rotating the rod 10.

In alinement with lock rod 7 the rod 10 is provided with an annular enlargement 14 which is toothed as shown at 15 throughout a portion of its periphery. The partial pinion thus formed meshes with a rack 16 provided upon lock rod 7 so that rotation of rod 10 by means of a suitable wrench will retract lock rod 7 within the member 4 and the release of operating rod 10 will cause the lock rod to be projected beyond member 4 through the tension of spring 8.

The shoulder 3 of the member 1 is provided with a groove 17 adapted to receive the end of lock rod 7 so as to lock the end members against relative rotation after they have been threaded together. The groove 17 is, preferably, an arcuate groove which tapers in width, as clearly shown in Fig. 2. One side wall of this groove is, preferably, stepped as shown at 18 so that when lock rod 17 engages the groove at various points along the same it will be projected to various depths into the groove for seating upon various ones of the steps, and thereby provide a positive lock between the locking rod and the member 1 irrespective of the position to which member 24 is turned relative to member 1.

It will be understood that a construction of this kind is necessary in order to provide a tight locking connection, since the threaded connection between members 1 and 4 is liable to become worn and the two members when threaded upon one another will thus be arranged at a slightly different position with relation to each other.

Various changes may be made without departing from the spirit of the invention as claimed.

What is claimed is:

1. The combination with members having a threaded joint, of a locking pin projected from one member, a circumferential groove in the other member adapted to receive said pin, one of the longitudinal contacting surfaces between said pin and groove being stepped circumferentially of said members.

2. The combination with members having a threaded joint, of a locking pin projected from one member, a groove in the other member tapering in width circumferentially and adapted to receive said pin, one of the longitudinal contacting surfaces between said pin and groove being stepped.

3. The combination with members having a threaded joint, of a locking pin projected from one member and adapted to be received in the other member, means for moving said pin including a transverse bore in one of the members receiving an operating rod co-operating with said pin, and a lock nut threaded into said transverse bore to removably retain said operating rod.

In testimony whereof we have signed our names to this specification.

CHARLES B. REYNOLDS.
CLARENCE D. REYNOLDS.